United States Patent [19]
Cox

[11] 3,986,727
[45] Oct. 19, 1976

[54] HITCH FOR LOW-BED TRAILERS
[76] Inventor: Ernest P. Cox, Box 154, Lolo, Mont. 59847
[22] Filed: Sept. 17, 1975
[21] Appl. No.: 613,971

[52] U.S. Cl. ............................. 280/423 R; 280/492
[51] Int. Cl.² ........................................ B62D 53/06
[58] Field of Search ........ 280/423 B, 423 R, 415 R, 280/415 B, 425 A, 474, 492

[56] References Cited
UNITED STATES PATENTS

| | | | |
|---|---|---|---|
| 2,212,081 | 8/1940 | Spires | 280/423 R |
| 2,471,636 | 5/1949 | Martin | 280/474 |
| 2,671,670 | 3/1954 | Page | 280/423 R |

Primary Examiner—M. H. Wood, Jr.
Assistant Examiner—John A. Pekar
Attorney, Agent, or Firm—Lawrence L. Colbert

[57] ABSTRACT

To facilitate transporting heavy equipment on forest service roads and the like by means of a low-bed trailer having a gooseneck drawbar, the customary fifth wheel pivotal connection between the towing tractor and trailer is immobilized relative to horizontal or side pivoting and the pivotal connection between the tractor and trailer is placed rearwardly of the tractor adjacent the bottom of the gooseneck. As a result, the tendency for the trailer to "cut the corner" on a sharp curve is substantially eliminated and the trailer will substantially follow the tracks of the tractor around such corners.

4 Claims, 6 Drawing Figures

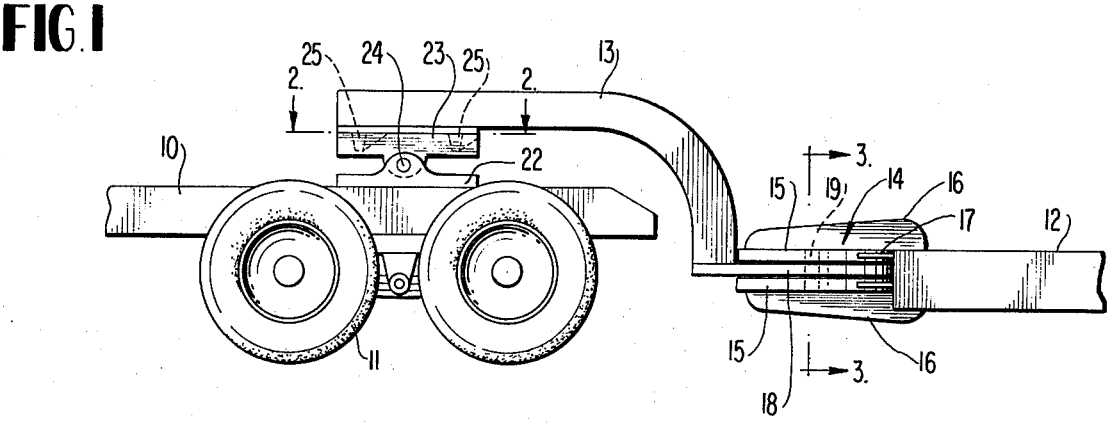
FIG.1
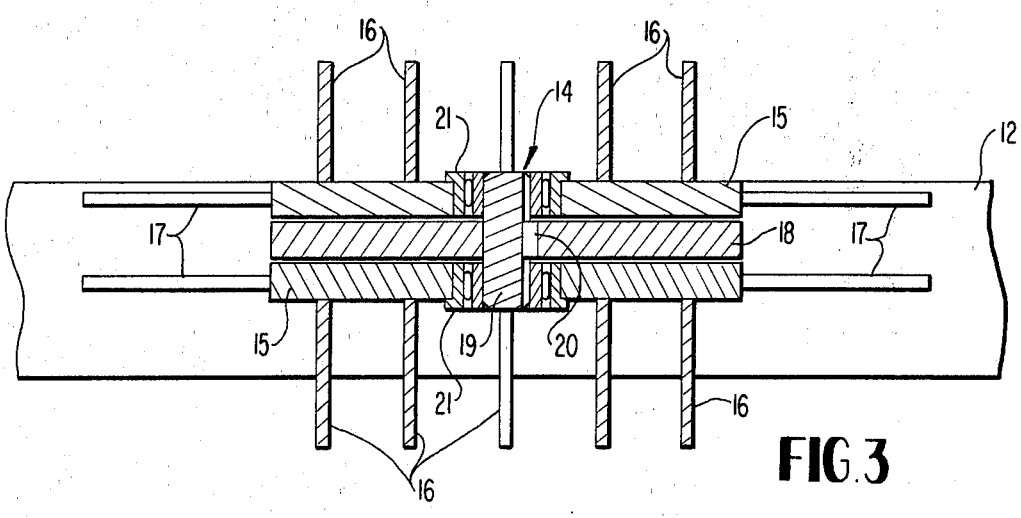
FIG.2
FIG.3

U.S. Patent    Oct. 19, 1976    Sheet 2 of 2    3,986,727
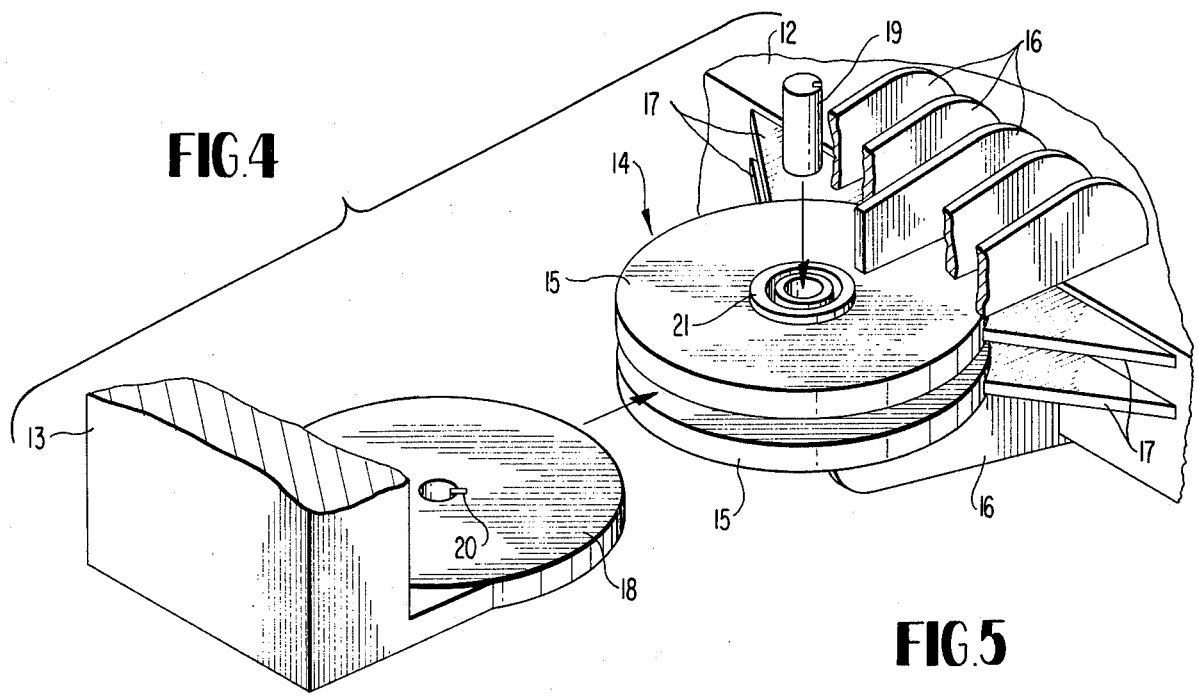
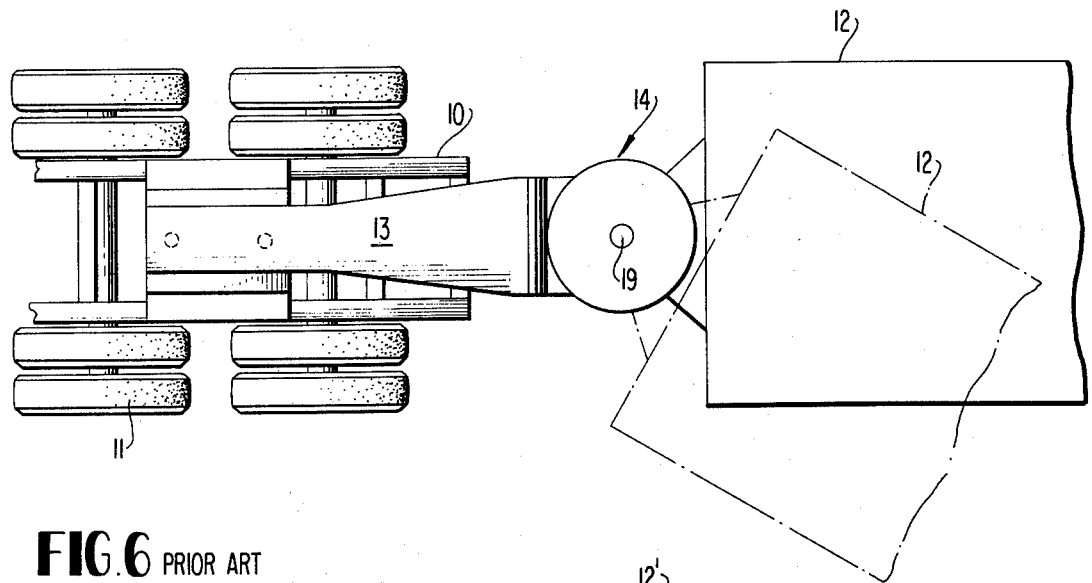
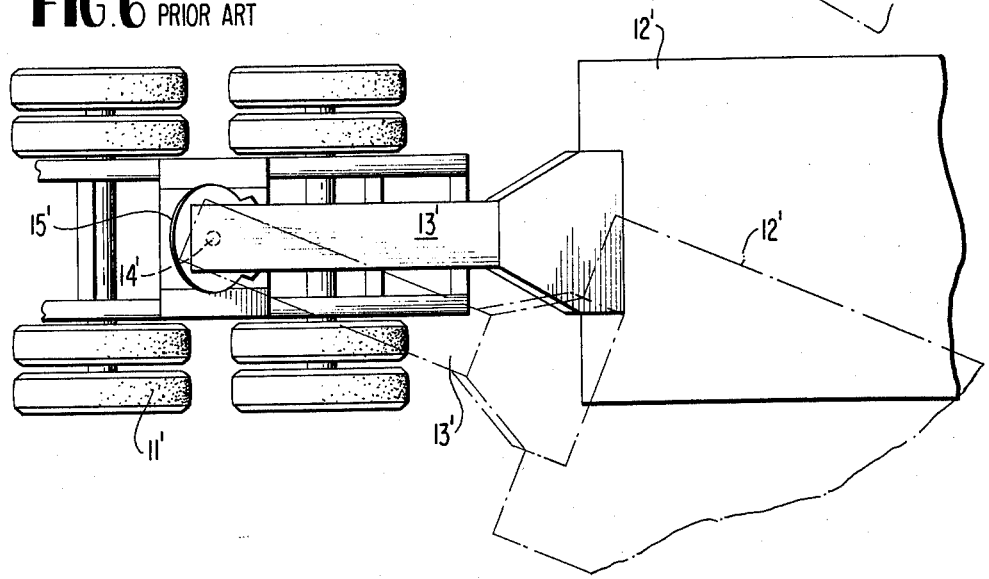

HITCH FOR LOW-BED TRAILERS

BACKGROUND OF THE INVENTION

Long low-bed trailers have always presented a problem in negotiation of sharp curves due to the tendency for the trailer to cut the corner and follow the path of least resistance in relation to the towing vehicle. Customarily, the towing vehicle or tractor is equipped with the well-known fifth wheel pivotal coupling which allows hitching up to and separation from the trailer gooseneck drawbar as well as pivoting of the gooseneck relative to the tractor horizontally or from side-to-side when negotiating turns. In order to concentrate the weight of the trailer through the gooseneck most advantageously over the rear axle assemblies of the tractor, it has always been deemed necessary to place the pivot of the trailer relative to the tractor on the strategically located fifth wheel assembly.

In recent times, the new service roads being constructed in national forests with many sharp curves have accentuated the problem and given rise to an urgent need to an improved arrangement which would enable low-bed trailers carrying heavy equipment to follow these roads satisfactorily. In the absence of a satisfactory solution to the problem, a great deal of expensive and unnecessary wear of heavy equipment, and much loss of time, has taken place where the equipment must be unloaded prior to reaching its ultimate point of use. In the case of forest fires, the fire may have advanced prohibitively far before the equipment can arrive.

Therefore, to meet the urgent needs of the art, the present invention has as its objective to provide a heavy equipment haulage caravan, including a low-bed gooseneck trailer, and a towing truck or tractor which is capable of negotiating much sharper curves than conventional caravans while still concentrating the load on the tractor at the customary point of the fifth wheel connection but without the horizontal pivoting at this point.

Instead, the pivotal connection is shifted rearwardly of the tractor and adjacent the bottom of the gooseneck drawbar, with the result that on sharp turns, the low-bed trailer will substantially follow the tracks of the towing vehicle without cutting the corner. Additionally, the relocated pivotal connection between the two components of the caravan is provided with increased strength capabilities and rigidity necessary to render the invention fully practical particularly in the handling of heavy equipment, as well as safe and reliable.

Other specific features and advantages of the invention will become apparent during the course of the following detailed description.

BRIEF DESCRIPTION OF DRAWING FIGURES

FIG. 1 is a fragmentary side elevation of a hitch for low-bed trailers embodying the present invention.

FIG. 2 is an enlarged horizontal section taken substantially on line 2—2 of FIG. 1.

FIG. 3 is an enlarged vertical section taken on line 3—3 of FIG. 1.

FIG. 4 is an exploded perspective view of a pivotal connection embodied in the invention.

FIG. 5 is a partly schematic plan view depicting the operation of the invention.

FIG. 6 is a similar plan view depicting the prior art.

DETAILED DESCRIPTION

Referring to the drawings in detail, the numeral 10 designates the main frame of a towing truck or tractor having a rear dual axle wheel assembly or dolly 11 of conventional construction. A low-bed trailer 12 of the type commonly employed to transport heavy road building equipment and the like is illustrated in trailing relation to the tractor 10. A gooseneck drawbar 13 interconnects the low-bed trailer 12 and tractor 10, as shown in the drawings.

Customarily, in the prior art, FIG. 6, the gooseneck drawbar 13' is rigidly attached to the low-bed trailer 12' and the forward end of the drawbar is pivotally connected by a king pin 14' to a conventional fifth wheel coupling assembly 15' mounted centrally on the rear dolly assembly 11' of the tractor. With this prior art arrangement, as shown in broken lines in FIG. 6, when the caravan is attempting to negotiate a sharp curve, the trailer 12' will not follow the tracks of the tractor but will tend to cut the corner, as illustrated, thus rendering it impossible for the caravan to be used on certain roadways, such as forest service roads.

In lieu of the prior art arrangement, continuing to refer to the drawings, the pivotal assembly or connection 14 forming a key part of this invention is relocated from the traditional point on the tractor and located rearwardly of the tractor at the base of the gooseneck drawbar 13.

The relocated pivotal assembly 14 comprises a pair of spaced superposed flat circular plates 15 welded to the front of the low-bed trailer 12 and rendered rigid therewith by a series of vertical braces 16 and coacting horizontal braces 17. A third plate 18, similar to the two plates 15, is intervened therebetween and welded to the rear end and base of the gooseneck drawbar 13 so as to lie in a horizontal plane. A vertical axis pivot pin 19 is keyed at 20 to the intermediate plate 18 and extends above and below the plate 18 in the assembly, FIG. 3, and is received within the inner races of a pair of roller bearings 21 carried centrally by the two plates 15 of the low-bed trailer. In this manner, an extremely strong and durable and efficiently operating pivotal connection is formed between the trailer 12 and the gooseneck drawbar 13, rather than between the latter and the customary fifth wheel of the tractor, as in the prior art.

In the invention, the gooseneck drawbar 13 is restrained from pivoting horizontally or from side-to-side on the towing tractor in the following manner.

At the location of the usual fifth wheel assembly, a fixed bed member 22 is firmly secured to the tractor frame 10 centrally of the rear dolly 11. A rocker plate 23 above the member 22 is pivoted thereto at 24 for limited vertical swinging movement when the caravan passes over uneven terrain. However, the transverse horizontal axis pivot element 24 will not allow any pivoting or swinging of the rocker plate 23 in a horizontal plane.

Near its forward end, the gooseneck drawbar 13 carries a pair of longitudinally spaced depending coupling pins 25 instead of the usual single coupling pin of the conventional fifth wheel structure. The two pins 25 are adapted to enter coupling ramps 26 in the upper face of the rocker plate 23 so that the low-bed trailer and tractor may be coupled and uncoupled substantially in a conventional manner. In this respect, the utility of the standard fifth wheel assembly is maintained in the invention. Also, the concentration of weight at the most desirable point on the tractor 10 is maintained in the invention. However, the two spaced coupling pins 25 positively prevent any horizontal swinging of the gooseneck drawbar 13 relative to the tractor 10 and the horizontal swinging or pivoting of the trailer relative to the tractor during turning operations takes place through the relocated assembly 14 in the manner graphically shown in FIG. 5. It will be noted by comparing FIGS. 5 and 6 that in the invention the low-bed trailer 12 will substantially follow the tracks of the towing vehicle 10 enabling the caravan to negotiate relatively sharp curves successfully while transporting heavy equipment. The corner cutting of the trailer prevalent in the prior art, FIG. 6, is almost completely eliminated with the attendant advantages already described.

During operation of the invention, the coupling and uncoupling of the trailer 12 and tractor 10 can be carried out substantially as with the conventional fifth wheel assembly. However, as explained, no horizontal pivoting of the gooseneck drawbar 13 relative to the tractor 10 is possible due to the pins 25. The rocker plate 23 can pivot fore and aft in a vertical plane only to compensate for irregularities in the terrain. The articulation pivot in the horizontal plane is through the assembly 14, as fully described, and which pivot assembly is located rearwardly of the tractor 10 at the base of the gooseneck drawbar 13. Through the described assembly 14, the gooseneck is pivotally attached to the front of the low-bed trailer 12 and is rigid with the tractor with respect to horizontal swinging. The construction is efficient, very sturdy and economical and does not add significantly to the weight of the caravan. It fully overcomes the needs of the art in terms of haulage equipment for heavy machinery on forest service roads and the like.

It is to be understood that the form of the invention herewith shown and described is to be taken as a preferred example of the same, and that various changes in the shape, size and arrangement of parts may be resorted to, without departing from the spirit of the invention or scope of the subjoined claims.

I claim:

1. In a haulage vehicle caravan including a tractor and a low-bed trailer having a gooseneck draw bar extending forwardly thereof and over and above the rear wheel assembly of the tractor, the improvement comprising a coupling means interconnecting the forward portion of the gooseneck draw bar with a bed portion of the tractor, said coupling means firmly resisting horizontal pivoting of the gooseneck draw bar relative to the tractor and allowing limited vertical rocking thereof relative to the tractor, and a pivot assembly rearwardly of the tractor and adjacent the base of the gooseneck draw bar and interconnecting said base with the leading end of the trailer, whereby said trailer may pivot horizontally in either direction relative to the tractor and the gooseneck draw bar, said coupling means comprising a fixed bed member on the tractor adjacent the rear wheel assembly of the tractor, a rocker plate above said bed member, a transverse horizontal axis pivot element interconnecting the rocker plate and bed member, the top of the rocker plate having fore and aft space coupling ramps therein, a pair of coacting fore and aft spaced depending coupling pins on the gooseneck draw bar adapted to be received releasably in said ramps.

2. In a haulage vehicle caravan including a tractor and a low-bed trailer having a gooseneck draw bar extending forwardly thereof and over and above the rear wheel assembly of the tractor, the improvement comprising a coupling means interconnecting the forward portion of the gooseneck draw bar with a bed portion of the tractor, said coupling means firmly resisting horizontal pivoting of the gooseneck draw bar relative to the tractor and allowing limited vertical rocking thereof relative to the tractor, and a pivot assembly rearwardly of the tractor and adjacent the base of the gooseneck draw bar and interconnecting said base with the leading end of said trailer, whereby said trailer may pivot horizontally in either direction relative to the tractor and the gooseneck draw bar, said pivot assembly including interfitting relatively movable plates, said pivot assembly including a pair of superposed plates secured to said trailer in vertically spaced relation, a single plate secured to the base of the gooseneck draw bar and being interposed between said pair of plates for relative turning movement horizontally, bearings mounted on said pair of plates centrally, and a vertical axis pivot element keyed to said single plate and projecting above and below the single plate and being engaged within said bearings.

3. The structure of claim 2, and said bearings comprising vertical axis roller bearings.

4. The structure of claim 3, and a plurality of spaced vertical brace plates interconnecting said pair of plates with said trailer and projecting substantially across the top and bottom faces of the upper and lower plates in said pair.

* * * * *